(12) United States Patent
Kamilov et al.

(10) Patent No.: US 10,409,888 B2
(45) Date of Patent: Sep. 10, 2019

(54) ONLINE CONVOLUTIONAL DICTIONARY LEARNING

(71) Applicant: Mitsubishi Electric Research Laboratories, Inc., Cambridge, MA (US)

(72) Inventors: Ulugbek Kamilov, Cambridge, MA (US); Kevin Degraux, Degraux (BE); Petros T Boufounos, Winchester, MA (US); Dehong Liu, Lexington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 180 days.

(21) Appl. No.: 15/636,795

(22) Filed: Jun. 29, 2017

(65) Prior Publication Data

US 2018/0349319 A1   Dec. 6, 2018

Related U.S. Application Data

(60) Provisional application No. 62/514,444, filed on Jun. 2, 2017.

(51) Int. Cl.
*G06F 17/16* (2006.01)
*G06K 9/62* (2006.01)
(Continued)

(52) U.S. Cl.
CPC .......... *G06F 17/16* (2013.01); *G06K 9/6249* (2013.01); *G06K 9/6289* (2013.01); *G06T 5/00* (2013.01);
(Continued)

(58) Field of Classification Search
CPC .......... G06T 5/002; G06T 2207/20081; G06K 9/6249; G06K 9/6289; G06K 2009/4695; G06F 17/16
See application file for complete search history.

(56) References Cited

U.S. PATENT DOCUMENTS

2016/0335224 A1   11/2016  Wohlberg

OTHER PUBLICATIONS

J. Mairal, F. Bach, J. Ponce, and G. Sapiro, "Online learning for matrix factorization and sparse coding," Journal of Machine Learning Research, vol. 11, pp. 19-60, 2010 (Year: 2010).*
(Continued)

*Primary Examiner* — Matthew D Sandifer
(74) *Attorney, Agent, or Firm* — Gennadiy Vinokur; James McAleenan; Hironori Tsukamoto

(57) ABSTRACT

Systems and methods for an imaging system including a first sensor to acquire a sequence of images of a first modality. A memory to store a first convolutional memory matrix. Wherein each element of the first convolutional memory matrix is a convolutional function of correspondingly located elements of coefficient matrices of convolutional representation of the images of the first modality, and to store a first dictionary matrix including atoms of the images of the first modality. A processor to transform a first image of a scene acquired by the first sensor as a convolution of the first dictionary matrix and a first coefficient matrix, to update the elements of the first convolutional memory matrix with the convolutional function of correspondingly located non-zero elements of the first coefficient matrix, and to update the dictionary matrix using the updated first convolutional memory matrix.

20 Claims, 13 Drawing Sheets

(51) Int. Cl.
G06T 5/00 (2006.01)
G06T 7/30 (2017.01)
G06K 9/46 (2006.01)

(52) U.S. Cl.
CPC ............ *G06T 5/002* (2013.01); *G06T 7/30* (2017.01); *G06K 2009/4695* (2013.01); *G06T 2207/20081* (2013.01)

(56) References Cited

OTHER PUBLICATIONS

B. Wohlberg, "Efficient algorithms for convolutional sparse representations," IEEE Transactions on Image Processing, vol. 25, No. 1, pp. 301-315, Jan. 2016 (Year: 2016).*

H. Bristow, A. Eriksson, and S. Lucey, "Fast convolutional sparse coding," in Proc. IEEE Conf. Comp. Vis. Pat. Recog. (CVPR), pp. 391-398, Jun. 2013 (Year: 2013).*

J. Liu, C. Garcia-Cardona, B. Wohlberg, W. Yin, "Online convolutional dictionary learning", Proc. IEEE Int. Conf. Image Process. (ICIP), pp. 1707-1711, Sep. 2017 (Year: 2017).*

K. Degraux, U. S. Kamilov, P. T. Boufounos, D. Liu, "Online convolutional dictionary learning for multimodal imaging", Proc. IEEE Conf. Image Process., pp. 1617-1621, Sep. 2017 (Year: 2017).*

Y. Wang, Q. Yao, J. T. Kwok, L. M. Ni, "Scalable Online Convolutional Sparse Coding", IEEE Trans. Image Process., vol. 27, No. 10, pp. 4850-4859, Oct. 2018 (Year: 2018).*

Serrano et al. "Convolutional Sparse Coding for High Dynamic Range Imaging." May 27, 2016 Computer Graphics Forum. The Eurographics Association and John Wiley & Sons Ltd. vol. 35, Issue 2, pp. 153-163.

Pu et al. "A Deep Generative Deconvolutional Image Model." Appearing in Proceedings of the 19th International Conference on Artificial Intelligence and Statistics (AISTATS) 2016, Cadiz, Spain. JMLR: W&CP vol. 41.

Lawrence Carin. "Convolutional Dictionary Learning and Feature Design." Sep. 16, 2014. https://cvt.engin.umich.edu/wp-content/uploads/sites/173/2014/10/Carin-Duke-PPT-Deep-Learning.pdf.

Arthur Mensch et al., "Stochastic Subsampling for Factorizing Huge Matrices," Arxiv.org, Cornell University Library, 201 Olin Library, Cornell University Ithaca, NY 14853, Jan. 19, 2017.

Chalasani Rakesh et al., "A Fast Proximal Method for Convolutional Sparse Coding," The 2013 International Joint Conference on Neural Networks, IEEE, Aug. 4, 2013, pp. 1-5.

Ivana Tosic et al., "Learning Joint Intensity Depth Sparse Representations," rxiv.org, Cornell University Library, 201 Olin Library, Cornell University Ithaca, NY 14853, Jan. 3, 2012.

* cited by examiner

1: procedure ONLINE CONVOLUTIONAL DICTIONARY LEARNING (OCDL)
2: input: Stream of data $t \mapsto (\mathbf{y}^t, \mathbf{\Phi}^t)$, initial dictionary $\mathbf{D}^0$.
3: $\quad \mathbf{C}^0 \leftarrow \mathbf{0}; \quad \mathbf{b}^0 \leftarrow \mathbf{0};$
4: $\quad$ while streaming data, do
5: $\qquad$ Draw a pair $(\mathbf{y}^t, \mathbf{\Phi}^t)$;
6: $\qquad$ Convolutional sparse coding step:
7: $\qquad\quad (\mathbf{x}^t, \boldsymbol{\alpha}^t) \leftarrow \underset{\mathbf{x}, \boldsymbol{\alpha}}{\arg\min}\, \{\mathcal{C}(\mathbf{x}, \boldsymbol{\alpha}; \mathbf{D}^{t-1} | \mathbf{y}^t, \mathbf{\Phi}^t)\};$
8: $\qquad$ Update convolutional memory matrix:
9: $\qquad\quad \mathbf{b}^t \leftarrow (1 - \frac{1}{t})\mathbf{b}^{t-1} + \frac{1}{t}[\mathbf{A}^t]^\mathsf{T}\mathbf{x}^t;$
10: $\qquad\quad \mathbf{C}^t \leftarrow (1 - \frac{1}{t})\mathbf{C}^{t-1} + \frac{1}{t}[\mathbf{A}^t]^\mathsf{T}\mathbf{A}^t;$
11: $\qquad$ Dictionary update initialized with $\mathbf{D}^{t-1}$:
12: $\qquad\quad \mathbf{D}^t \leftarrow \underset{\mathbf{D} \in \mathcal{D}}{\arg\min}\, \frac{1}{2t} \sum_{i=1}^{t} \|\mathbf{x}^i - \mathbf{D}\boldsymbol{\alpha}^i\|_2^2;$

FIG. 1E

1: procedure CONVOLUTIONAL SPARSE CODING
2: input: Input image $y$, measurement operator $\Phi$, current dictionary $D$, positive parameters $\rho, \lambda, \tau > 0$, step-size parameters $\gamma_x, \gamma_\alpha > 0$.
3: $\quad x^0 \leftarrow 0; \quad \alpha^0 \leftarrow 0; \quad t \leftarrow 1;$
4: repeat
5: $\quad$ Compute gradient with respect to $x$:
6: $\quad \Delta x^t \leftarrow [\Phi^T(\Phi x^{t-1} - y) + \rho(x^{t-1} - D\alpha^{t-1})];$
7: $\quad$ Compute gradient with respect to $\alpha$:
8: $\quad \Delta \alpha^t \leftarrow [\rho D^T(D\alpha^{t-1} - x^{t-1})];$
9: $\quad$ Update image:
10: $\quad x^t \leftarrow \text{prox}_{\mathcal{R}}(x^{t-1} - \gamma_x \Delta x^t, \gamma_x \tau);$
11: $\quad$ Update coefcients:
12: $\quad \alpha^t \leftarrow \text{SoftThreshold}(\alpha^{t-1} - \gamma_\alpha \Delta \alpha^t; \gamma_\alpha \lambda)$
13: $\quad t \leftarrow t + 1$
14: until stopping criterion
15: return: Final coefficient matrices $\alpha^t$ and output image $x^t$

FIG. 3A

1: procedure DICTIONARY UPDATE
2: input: Convolutional memory matrix $[\mathbf{C}, \mathbf{b}]$, elements of current dictionary in a vectorized form $\mathbf{d}$, step-size parameter $\gamma > 0$.
3: $\quad t \leftarrow 1$ and $\mathbf{d}^0 \leftarrow \mathbf{d}$;
4: repeat
5: $\quad$ Compute gradient with respect to $\mathbf{d}$:
6: $\quad \Delta \mathbf{d}^t \leftarrow \mathbf{C}\mathbf{d}^{t-1} - \mathbf{b}$;
7: $\quad$ Update elements:
8: $\quad \mathbf{d}^t \leftarrow \mathbf{d}^{t-1} - \gamma \Delta \mathbf{d}^t$;
9: $\quad$ Project dictionary atoms:
10: $\quad \mathbf{d}_k^t \leftarrow \frac{\mathbf{d}_k^t}{\max\{\|\mathbf{d}_k^t\|, 1\}}$ for every $k = 1, \ldots, K$;
11: $\quad t \leftarrow t + 1$
12: until stopping criterion
13: return: Dictionary $\mathbf{D}^t$ specified by its elements $\mathbf{d}^t$

FIG. 4

ONLINE CONVOLUTIONAL DICTIONARY LEARNING

FIELD

The present disclosure relates to systems and methods for sparse coding, and more particularly, to online convolutional dictionary learning that uses convolutional sparse coding to update the dictionary of atoms of the images.

BACKGROUND

In signal processing, a signal that is to be measured and the measurement process itself can contain noise, as well as contribute to an amount of noise. Noise effects signal processing, so it is better to eliminate noise to obtain a better signal processing result, such as sharper images. Typically, the process of signal measurement requires a significant amount of processing time, which can be a challenge for today's technological applications that require less processing time and a given quality of a result.

For example, if a measured signal is to be transferred to some other location, some advantageous to sending the measured signal may include reducing the amount of data being sent to as small as possible so as to lower the required bandwidth. Another advantage to sending the measured signal may include increasing the rate of sending the measured signal (complete measurements), such as the frame rate for video signal transmissions.

Sparse representation of signals is a signal processing technology in which noise, which cannot be represented sparsely, can be filtered out. The sparse representation of a given signal can be estimated from a small number of measurements, where small is compared to the dimension of the signal. Also, a sparse representation generally means that the data is compressed.

There are numerous sparse representation learning algorithms known in the art which are used for a broad range of signal and/or image processing applications. For instance, sparse representations may be used for labeling objects in images to identify and classify what objects are present. Given a signal s and a dictionary matrix D, sparse coding is the inverse problem of finding the sparse representation x with only a few non-zero entries such that $Dx \approx s$. The process of arriving at these identifications requires a technique for learning the dictionary matrix D, referred herein as dictionary learning. Further, learning the dictionary matrix using the sparse representation may be beneficial for some applications. However, offline learning limits the dictionary matrix to represent only images used for the training. Thus, the offline learned dictionary lacks the flexibility and adaptability to the variety of images that can be accounted in real time.

Also, these sparse representation learning algorithms are not scalable to large data dimensional inputs, and are conventionally viewed as not suited for some technological applications.

There are known hardware designs for operating on large data sets, e.g. large matrix multiplications and neural network simulations. Neural network simulators are known that typically use mixed analog-digital signals, but these make it harder to scale up the hardware. Also, in digital signal operations the bandwidth with which data can be downloaded to the hardware limits the practical size of the hardware.

Accordingly, there is a need for systems and methods suitable for acquiring measurements of an object using multiple distinct sensing modalities. Wherein data acquired from the sensors can be jointly processed to improve the imaging quality in one or more of the acquired modalities. Which can result in providing complementary sources of information about objects, overcoming hardware limitations, or reducing data uncertainty due to each individual sensor.

SUMMARY

Embodiments of the present disclosure provide for systems and methods for sparse coding, and more particularly, to online convolutional dictionary learning that uses convolutional sparse coding to update the dictionary of atoms of the images.

An important step in multimodal imaging is the identification of related features in multiple modalities that can be exploited to improve the quality of multimodal imaging. In particular, several measurements of features are acquired using multiple distinct sensing modalities, and the data acquired from the sensors is jointly processed to improve the imaging quality in one or more of the acquired modalities. However, the identification and extraction of those features from the multimodal measurements are challenging.

Embodiments of the present disclosure are based on a realization that it is possible to reformulate the convolutional dictionary learning with a variable splitting technique, which then allows to aggregate all the coefficient matrices into a single convolutional memory matrix sufficient for the convolutional dictionary learning.

However, discovering to modify CDL proved to be challenging for many reasons. For example, CDL represents an image as a convolution of a dictionary and a coefficient matrix, and aims to learn the dictionary from a set of coefficient matrices representing the corresponding set of images. The coefficient matrix is a sparse representation of the corresponding image. However, a number of coefficient matrices for a CDL need to be sufficiently large which amounts to significant memory resource allocated for the CDL, i.e. the usage of a sparse representation requires a lot of memory. Not all devices can dedicate so much memory resources to such learning methods. Further, CDL is difficult to scale to very-large datasets, such as streaming multimodal video sequences, as the cost of learning scales proportionally to the number of data-entries, e.g., a number of video frames. For example, data required to learn the dictionary matrix for a one-minute video at 25 fps of one-megapixel frames could occupy about 715 GB of memory. Which means, CDL methods can work only with small datasets, that limits their applicability to multimodal sensor fusion. Currently, CDL may be used only offline and is not suitable for real-time fusion. To that end, we needed to overcome the above limitations so we can use CDL.

We discovered we could modify CDL by reformulating convolutional learning with the variable splitting technique, which then allows us to aggregate all the coefficient matrices (715 GB for 1 Megapixel image without out aggregation) into a single convolutional memory matrix (1 KB), which is sufficient for learning. Convolutional memory matrix is constructed by additively convolving correspondingly located elements of coefficient matrices of convolutional representation of the images.

For example, instead of performing the CDL on a set of coefficient matrices, which in one example can take up to 715 GB of memory, we determine an additively convolution of those coefficient matrices that result in a single convolutional memory matrix, which in corresponding example can take one KB of memory, and learn the dictionary matrix based on that convolutional memory matrix. The usage of convolutional memory matrix can significantly reduce the amount of memory allocated for the CDL and can make the CDL suitable for online applications. For instance, now due to the convolutional learning's memory efficiency, the large-scale CDL method of the present disclosure makes possible learning of related features directly from the streamed data with joint convolutional sparse coding, which leads to improvements in the quality of the fused data.

An additional benefit of the present disclosure's formulation is that it allows to incorporate an additional denoising mechanism to work directly with the raw sensor data. Specifically, the application of conventional CDL requires learning on noiseless images or images with very low amount of noise. This was because the learning algorithms tried to fit the dictionary directly to the image, which means that when the image is noisy, the algorithm ended up learning the noise. However, the present disclosure's formulation circumvents this (conventional application) by making it possible to further regularize the solution with total variation allowing to work directly with sensor data, which typically contains measurement noise.

To that end, some embodiments disclose an imaging system storing a dictionary matrix that includes atoms of the images of the first modality. Each element of the convolutional memory matrix is a convolutional function of correspondingly located elements of coefficient matrices of convolutional representation of the images.

To better understand the present disclosure, we provide at least one method that can be used for implementing of the present disclosure. The method can include a processor operatively connected to the memory that is encoded to transform an image of a scene as a convolution of the dictionary matrix and a first coefficient matrix. It is contemplated that the image being applied can be a two-dimensional image, or specifically a three-dimensional image, such as at CT scans. Also noted, is that the present disclosure methods can be useful for speech processing and the like.

For example, the processor can transform the first image using a convolutional sparse coding. Next, the processor can update the elements of the convolutional memory matrix with the convolutional function of correspondingly located non-zero elements of the first coefficient matrix, and can update the dictionary matrix using the updated convolutional memory matrix. In such a manner, the dictionary matrix is updated with the information learned from the image without increasing the size of the convolutional memory matrix.

Further, the imaging system can perform updating the convolutional memory matrix and the dictionary matrix iteratively for different images in a sequence of images acquired by a sensor. For example, after the convolutional memory matrix and the dictionary matrix are updated based on the first image, the convolutional memory matrix and the dictionary matrix are further updated based on the second image acquired by the sensor.

Specifically, the processor transforms the second image as a convolution of the updated dictionary matrix and a second coefficient matrix and further updates the elements of the convolutional memory matrix with the convolutional function of correspondingly located non-zero elements of the second coefficient matrix. Next, the processor further updates the updated dictionary matrix using the updated convolutional memory matrix. In such a manner, the dictionary matrix is further updated with the information learned from the second image without increasing the size of the convolutional memory matrix.

Some embodiments are based on another realization that the linearity of the dictionary updates in the dictionary atoms enables to aggregate all the past coefficient matrices into a compact convolutional memory matrix. For example, the convolutional memory matrix is constructed by additively convolving correspondingly located elements of coefficient matrices of convolutional representation of the images. For instance, the convolutional memory matrix can be iteratively updated by using a convolutional function of correspondingly located elements of coefficient matrices. In various embodiments, the convolutional function includes a selection from a sum of convolutions. For example, in one embodiment, the convolutional function is based on $S(\check{x}_m * x_{m'})$ where S is the selection operator and $\check{x}_m$ is the flipped version of the coefficient matrix $x_m$.

The online convolutional dictionary learning can be useful for a number of different applications, such as image compression, image fusion, data fusion, denoising and inpainting. For example, fusion systems can acquire several measurements of a scene using multiple distinct sensing modalities. The data acquired from the sensors are jointly processed to improve the imaging quality in one or more of the acquired modalities. Such imaging methods have the potential to enable new capabilities in in sensing systems, such as providing complementary sources of information about objects in a scene, overcoming hardware limitations, or reducing data uncertainty due to each individual sensor.

Some embodiments of the present disclosure are based on another realization that for the data fusion, co-occurring features should not be imposed, but learned from the measurements, because multi-modal images of different scenes might have different types of co-occurring features. We discovered from co-occurring features imposed from measurements, i.e. features of images in one modality that are replicated, in some form, in other modalities, leads to many problems, such as, by non-limiting example, poor quality images. At least one reason for the poor quality images, among many reasons, is due to the large variability in the scene, those hand-crafted features, i.e. replicated features, can lead to artifacts in the fused images, when assumed features are not present in the scene.

Convolutional dictionary learning can be used for learning related features by imposing joint-sparsity constraints on the coefficients during learning. However, to make the convolutional dictionary learning, the dictionary matrix should reflect the current images sensed for the data fusion. In other words, for the data fusion, the convolutional dictionary learning needs to be performed online, i.e., concurrently with fusing the data.

To that end, some embodiments acquire images in different modalities and transform corresponding images of a scene in a first modality and a second modality using a joint convolutional sparse coding with a first dictionary matrix learned for the images in the first modality and a second dictionary matrix learned for the images in the second modality. The joint convolutional sparse coding provides an efficient tool for feature-level fusion of sources of information. Instead of imposing the co-occurring features on images of different modalities, the joint convolutional sparse coding encourages sharing the information between images in different modalities. In such a manner, the information in one image in one modality can be propagated into another image in another modality without knowing in advance the type of that information.

Hence, some embodiments use the joint convolutional sparse coding on corresponding images of different modalities to produce a first coefficient matrix representing a first image of the scene in the first modality and a second coefficient matrix representing a second image of the scene of the second modality. Those coefficient matrices can be used to provide fused output images. For example, one embodiment determines a first output image in the first modality using a convolution of the first coefficient matrix and the first dictionary matrix and determines a second output image in the second modality using a convolution of the second coefficient matrix and the second dictionary matrix.

According to an embodiment of the present disclosure, an imaging system including a first sensor to acquire a sequence of images of a first modality. A memory to store a first convolutional memory matrix. Wherein each element of the first convolutional memory matrix is a convolutional function of correspondingly located elements of coefficient matrices of convolutional representation of the images of the first modality, and to store a first dictionary matrix including atoms of the images of the first modality. A processor to transform a first image of a scene acquired by the first sensor as a convolution of the first dictionary matrix and a first coefficient matrix, to update the elements of the first convolutional memory matrix with the convolutional function of correspondingly located non-zero elements of the first coefficient matrix, and to update the dictionary matrix using the updated first convolutional memory matrix.

According to an embodiment of the present disclosure, a method for image processing. The method uses a processor coupled to a memory storing a first convolutional memory matrix. Wherein each element of the first convolutional memory matrix is a convolutional function of correspondingly located elements of coefficient matrices of convolutional representation of the images of a first modality, the memory storing a first dictionary matrix including atoms of the images of the first modality. Wherein the processor is coupled with stored instructions implementing the method, wherein the instructions, when executed by the processor carry out at least some steps of the method. The method including transforming a first image of a scene in the first modality as a convolution of the first dictionary matrix and a first coefficient matrix. Updating the elements of the first convolutional memory matrix with the convolutional function of correspondingly located non-zero elements of the first coefficient matrix. Finally, updating the first dictionary matrix using the updated first convolutional memory matrix, wherein the updated dictionary matrix assists in improving imaging processing such as with denoising as well as with data fusion.

According to another embodiment of the present disclosure, a non-transitory computer readable storage medium embodied thereon a program executable by a computer for performing a method. The method including transforming corresponding images of a scene in a first modality and a second modality using a joint convolutional sparse coding with a first dictionary matrix learned for the images in the first modality. A second dictionary matrix learned for the images in the second modality to produce a first coefficient matrix representing a first image of the scene in the first modality and a second coefficient matrix representing a second image of the scene of the second modality. Determining a first output image in the first modality using a convolution of the first coefficient matrix and the first dictionary matrix. Determining a second output image in the second modality using a convolution of the second coefficient matrix and the second dictionary matrix. Updating the first convolutional memory matrix with a convolutional function of correspondingly located non-zero elements of the first coefficient matrix. Updating the second convolutional memory matrix with the convolutional function of correspondingly located non-zero elements of the second coefficient matrix. Updating the first dictionary matrix using a convolution of the first coefficient matrix and the first convolutional memory matrix. Finally, updating the second dictionary matrix using a convolution of the second coefficient matrix and the second convolutional memory matrix.

Further features and advantages will become more readily apparent from the following detailed description when taken in conjunction with the accompanying drawings.

DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 1E is a pseudo code for implementation of OCDL according to one embodiment of the present disclosure;

FIG. 3A is a pseudo code for implementation of convolutional sparse coding according to one embodiment of the present disclosure;

FIG. 4 is a pseudo code for implementation of dictionary update according to one embodiment of the present disclosure;

Figure 1A:
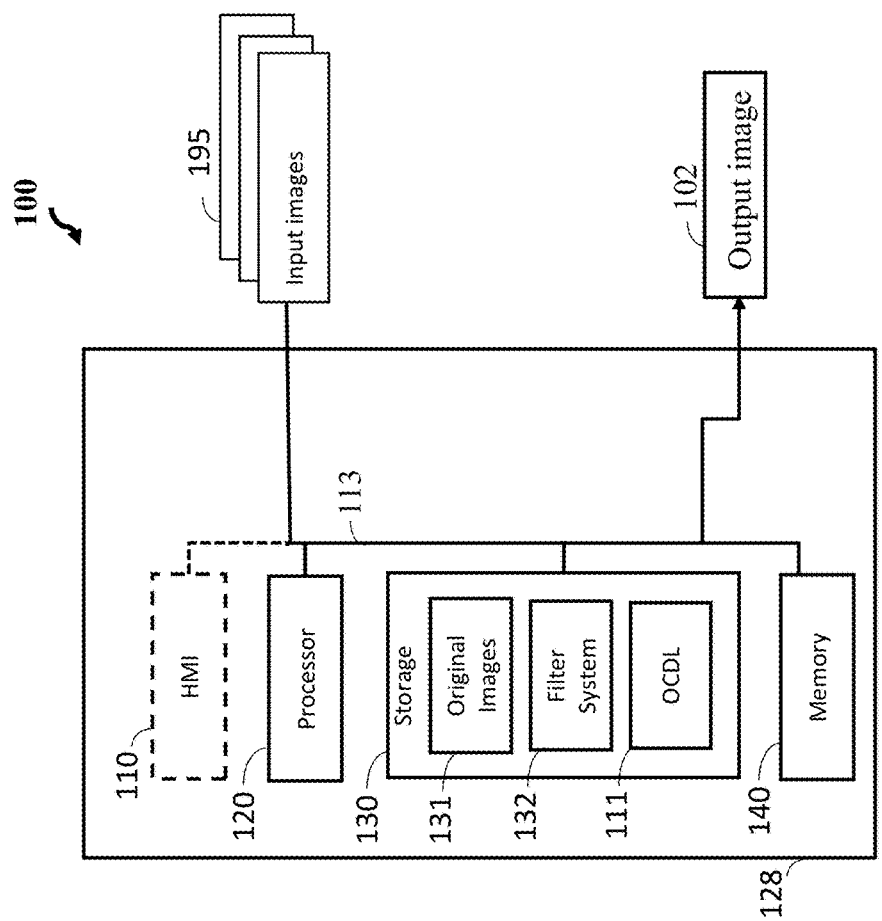
FIG. 1A is a block diagram of a computer system for online convolutional dictionary learning (OCDL) from a sequence of input images in accordance with some embodiments of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims. Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Overview

Embodiments of the present disclosure provide for systems and methods for sparse coding, and more particularly, to online convolutional dictionary learning that uses convolutional sparse coding to update the dictionary of atoms of the images.

An important step in multimodal imaging is the identification of related features in multiple modalities that can be exploited to improve the quality of multimodal imaging. In particular, several measurements of features are acquired using multiple distinct sensing modalities, and the data acquired from the sensors is jointly processed to improve the imaging quality in one or more of the acquired modalities. However, the identification and extraction of those features from the multimodal measurements are challenging.

Embodiments of the present disclosure are based on a realization that it is possible to reformulate the convolutional dictionary learning with a variable splitting technique, which then allows to aggregate all the coefficient matrices into a single convolutional memory matrix sufficient for the convolutional dictionary learning.

However, discovering to modify CDL proved to be challenging for many reasons. For example, CDL represents an image as a convolution of a dictionary and a coefficient matrix, and aims to learn the dictionary from a set of coefficient matrices representing the corresponding set of images. The coefficient matrix is a sparse representation of the corresponding image. However, a number of coefficient matrices for a CDL need to be sufficiently large which amounts to significant memory resource allocated for the CDL, i.e. the usage of a sparse representation requires a lot of memory. Not all devices can dedicate so much memory resources to such learning methods. Further, CDL is difficult to scale to very-large datasets, such as streaming multimodal video sequences, as the cost of learning scales proportionally to the number of data-entries, e.g., a number of video frames. For example, data required to learn the dictionary matrix for a one-minute video at 25 fps of one-megapixel frames could occupy about 715 GB of memory. Which means, CDL methods can work only with small datasets, that limits their applicability to multimodal sensor fusion. Currently, CDL may be used only offline and is not suitable for real-time fusion. To that end, we needed to overcome the above limitations so we can use CDL.

We discovered we could modify CDL by reformulating convolutional learning with the variable splitting technique, which then allows us to aggregate all the coefficient matrices (715 GB for 1 Megapixel image without out aggregation) into a single convolutional memory matrix (1 KB), which is sufficient for learning. Convolutional memory matrix is constructed by additively convolving correspondingly located elements of coefficient matrices of convolutional representation of the images.

For example, instead of performing the CDL on a set of coefficient matrices, which in one example can take up to 715 GB of memory, we determine an additively convolution of those coefficient matrices that result in a single convolutional memory matrix, which in corresponding example can take one KB of memory, and learn the dictionary matrix based on that convolutional memory matrix. The usage of convolutional memory matrix can significantly reduce the amount of memory allocated for the CDL and can make the CDL suitable for online applications. For instance, now due to the convolutional learning's memory efficiency, the large-scale CDL method of the present disclosure makes possible learning of related features directly from the streamed data with joint convolutional sparse coding, which leads to improvements in the quality of the fused data.

An additional benefit of the present disclosure's formulation is that it allows to incorporate an additional denoising mechanism to work directly with the raw sensor data. Specifically, the application of conventional CDL requires learning on noiseless images or images with very low amount of noise. This was because the learning algorithms tried to fit the dictionary directly to the image, which means that when the image is noisy, the algorithm ended up learning the noise. However, the present disclosure's formulation circumvents this (conventional application) by making it possible to further regularize the solution with total variation allowing to work directly with sensor data, which typically contains measurement noise.

To that end, some embodiments disclose an imaging system storing a dictionary matrix that includes atoms of the images of the first modality. Each element of the convolutional memory matrix is a convolutional function of correspondingly located elements of coefficient matrices of convolutional representation of the images.

To better understand the present disclosure, we provide at least one method that can be used for implementing of the present disclosure. The method can include a processor operatively connected to the memory that is encoded to transform an image of a scene as a convolution of the dictionary matrix and a first coefficient matrix.

For example, the processor can transform the first image using a convolutional sparse coding. Next, the processor can update the elements of the convolutional memory matrix with the convolutional function of correspondingly located non-zero elements of the first coefficient matrix, and can update the dictionary matrix using the updated convolutional memory matrix. In such a manner, the dictionary matrix is updated with the information learned from the image without increasing the size of the convolutional memory matrix. Further, at least one aspect of an updated dictionary matrix assists in improving imaging processing such as with denoising as well as with data fusion.

Further, the imaging system can perform updating the convolutional memory matrix and the dictionary matrix iteratively for different images in a sequence of images acquired by a sensor. For example, after the convolutional memory matrix and the dictionary matrix are updated based on the first image, the convolutional memory matrix and the dictionary matrix are further updated based on the second image acquired by the sensor.

Specifically, the processor transforms the second image as a convolution of the updated dictionary matrix and a second coefficient matrix and further updates the elements of the convolutional memory matrix with the convolutional function of correspondingly located non-zero elements of the second coefficient matrix. Next, the processor further updates the updated dictionary matrix using the updated convolutional memory matrix. In such a manner, the dictionary matrix is further updated with the information learned from the second image without increasing the size of the convolutional memory matrix.

Some embodiments are based on another realization that the linearity of the dictionary updates in the dictionary atoms enables to aggregate all the past coefficient matrices into a compact convolutional memory matrix. For example, the convolutional memory matrix is constructed by additively convolving correspondingly located elements of coefficient matrices of convolutional representation of the images. For instance, the convolutional memory matrix can be iteratively updated by using a convolutional function of correspondingly located elements of coefficient matrices. In various embodiments, the convolutional function includes a selection from a sum of convolutions. For example, in one embodiment, the convolutional function is based on $S(\check{x}_m * x_m)$ where S is the selection operator and $\check{x}_m$ is the flipped version of the coefficient matrix $x_m$.

The online convolutional dictionary learning can be useful for a number of different applications, such as image compression, image fusion, inpainting, denoising and data fusion. For example, fusion systems can acquire several measurements of a scene using multiple distinct sensing modalities. The data acquired from the sensors are jointly processed to improve the imaging quality in one or more of the acquired modalities. Such imaging methods have the potential to enable new capabilities in in sensing systems, such as providing complementary sources of information about objects in a scene, overcoming hardware limitations, or reducing data uncertainty due to each individual sensor.

Some embodiments of the present disclosure are based on another realization that for the data fusion, co-occurring features should not be imposed, but learned from the measurements, because multi-modal images of different scenes might have different types of co-occurring features. We discovered from co-occurring features imposed from measurements, i.e. features of images in one modality that are replicated, in some form, in other modalities, leads to many problems, such as, by non-limiting example, poor quality images. At least one reason for the poor quality images, among many reasons, is due to the large variability in the scene, those hand-crafted features, i.e. replicated features, can lead to artifacts in the fused images, when assumed features are not present in the scene.

Convolutional dictionary learning can be used for learning related features by imposing joint-sparsity constraints on the coefficients during learning. However, to make the convolutional dictionary learning, the dictionary matrix should reflect the current images sensed for the data fusion. In other words, for the data fusion, the convolutional dictionary learning needs to be performed online, i.e., concurrently with fusing the data.

To that end, some embodiments acquire images in different modalities and transform corresponding images of a scene in a first modality and a second modality using a joint convolutional sparse coding with a first dictionary matrix learned for the images in the first modality and a second dictionary matrix learned for the images in the second modality. The joint convolutional sparse coding provides an efficient tool for feature-level fusion of sources of information. Instead of imposing the co-occurring features on images of different modalities, the joint convolutional sparse coding encourages sharing the information between images in different modalities. In such a manner, the information in one image in one modality can be propagated into another image in another modality without knowing in advance the type of that information.

Hence, some embodiments use the joint convolutional sparse coding on corresponding images of different modalities to produce a first coefficient matrix representing a first image of the scene in the first modality and a second coefficient matrix representing a second image of the scene of the second modality. Those coefficient matrices can be used to provide fused output images. For example, one embodiment determines a first output image in the first modality using a convolution of the first coefficient matrix and the first dictionary matrix and determines a second output image in the second modality using a convolution of the second coefficient matrix and the second dictionary matrix.

Additionally, or alternatively, some embodiments use these coefficient matrices to update the corresponding convolutional memory matrices and ultimately corresponding dictionary matrices that can be used for the data fusion in the next iteration.

For example, one embodiment updates the first convolutional memory matrix with a convolutional function of correspondingly located non-zero elements of the first coefficient matrix and updates the second convolutional memory matrix with the convolutional function of correspondingly located non-zero elements of the second coefficient matrix. Next, the embodiment updates the first dictionary matrix using a convolution of the first coefficient matrix and the first convolutional memory matrix and updates the second dictionary matrix using a convolution of the second coefficient matrix and the second convolutional memory matrix.

Some embodiments are based on another realization that online convolutional dictionary learning allows to incorporate an additional denoising mechanism to work directly with the raw sensor data thus improving image representation and/or data fusion. For example, some embodiments transform the images using a prior information on the structure of the first image. Examples of such a prior information include a total variation of values in the images.

For example, some embodiments use a multimodal convolutional dictionary learning algorithm under the joint sparsity constraint to enforce the encoding of co-occurring features. In this formulation, the multimodal convolutional dictionaries are learned simultaneously with their corresponding coefficient matrices. The resulting multimodal convolutional dictionaries can generate sparse codes from the data that are optimized for a given imaging task such as denoising, enhancement, or upsampling.

FIG. 1A shows a block diagram of a computer system for online convolutional dictionary learning (OCDL) in accordance with some embodiment of the present disclosure. The computer system 100 includes input images 195 that can be frames of a video of a scene. The input images 195 can be in communication with a processor 120 via a bus 113 of a computer/controller 128. The processor 120 is in communication with memory 140 via bus 113, wherein the memory 140 stores instructions that are executable by the processor 120. The processor 120 can be a single core processor, a multi-core processor, a computing cluster, or any number of other configurations. The memory 140 can include random access memory (RAM), read only memory (ROM), flash memory, or any other suitable memory systems. The system 100 can include storage 130 that may include original images 131, a filter system 132 and an online convolutional dictionary learning (OCDL) 111. Finally, an output image 102 can be produced and outputted by the system via bus 113.

Still referring to FIG. 1A, the system 100 optionally can be connected to Human Machine Interface (HMI) 110 connected to bus 113, wherein the HMI may be in communication with several devices. The processor 120 can optionally be connected through a bus 113 to a display interface 160 connect to a display device 165. Further, the processor 120 can optionally be connected to an imaging interface 170 connected to an imaging device 175 via bus 113.

Figure 1B:
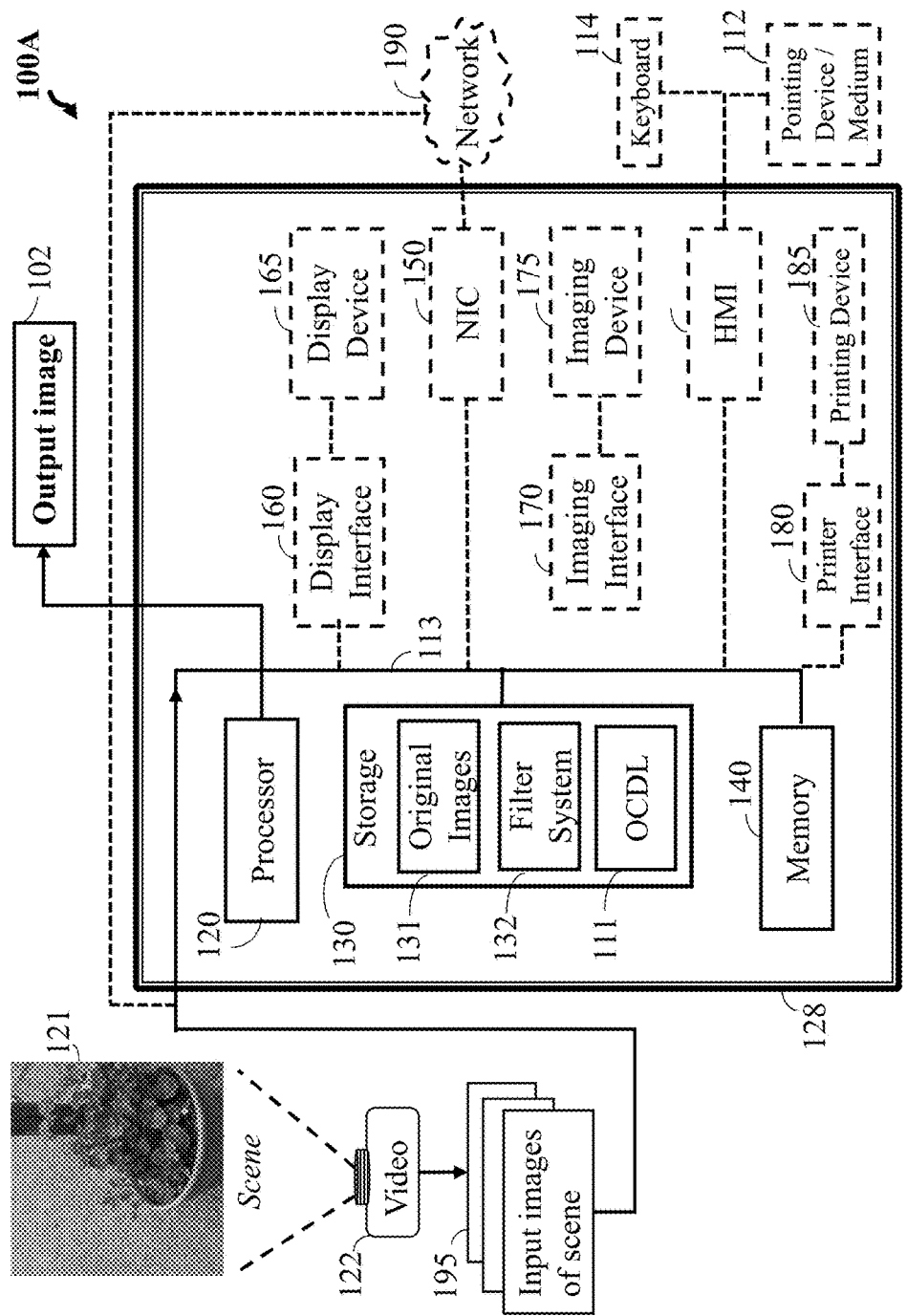
FIG. 1B is a block diagram of an alternate computer system for online convolutional dictionary learning (OCDL) from a sequence of input images in accordance with some embodiments of the present disclosure.

FIG. 1B is a block diagram of an alternate computer system of FIG. 1A in accordance with some embodiments of the present disclosure. The system 100A includes a scene 121 for a device 122, such as a video camera, to gather input images 195 that can be frames of a video. A computer/controller 128 can include a processor 120 configured to execute stored instructions, as well as memory 140 that stores instructions that are executable by the processor. The system 100A can include storage 130 that may include original images 131, a filter system 132 and an online convolutional dictionary learning (OCDL) 111. Finally, an output image 102 can be produced and outputted by the system via bus 113.

Still referring to FIG. 1B, the system 100A includes the processor 120 to be optionally connected through a bus 113 to a display interface 160 connect to a display device 165. Further, the processor 120 can optionally be connected to an imaging interface 170 connected to an imaging device 175 via bus 113. Further the input images 195 can be connected to a network 190 that is connected to a Network Interface Controller (NIC) 150 in communication with the bus 113. The system 100A can include a keyboard 114 connected to a Human Machine Interface (HMI) 110 connected to bus 113. Further, the system 100 can include a printer interface 180 in communication with a printing device 185.

Figure 1C:
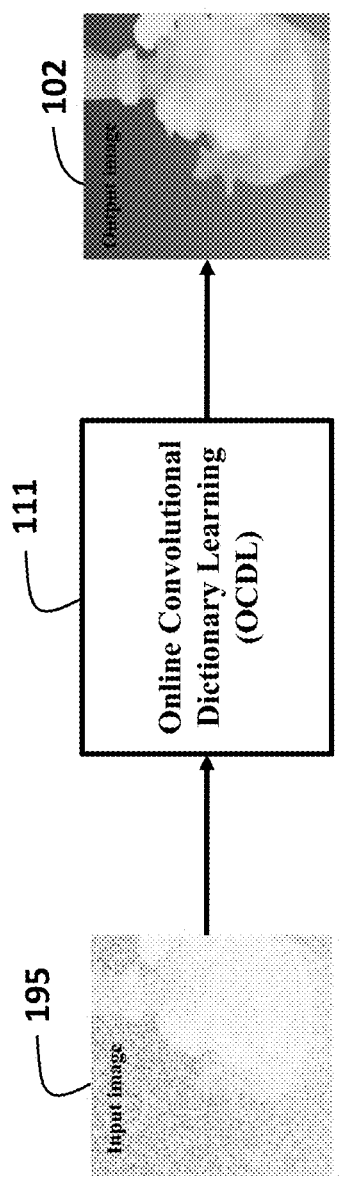
FIG. 1C is a schematic of depth image upsampling using OCDL in accordance with some embodiments of the present disclosure.

FIG. 1C shows a schematic of processing a first input image 195 with online convolutional dictionary learning (OCDL) 111 in accordance with some embodiments of the present disclosure. The OCDL 111 can be performed by the processor executing the instruction stored in the memory. In some embodiments, OCDL 111 processes an input image 101 to produce an output image 102 of higher spatial resolution.

Figure 1D:
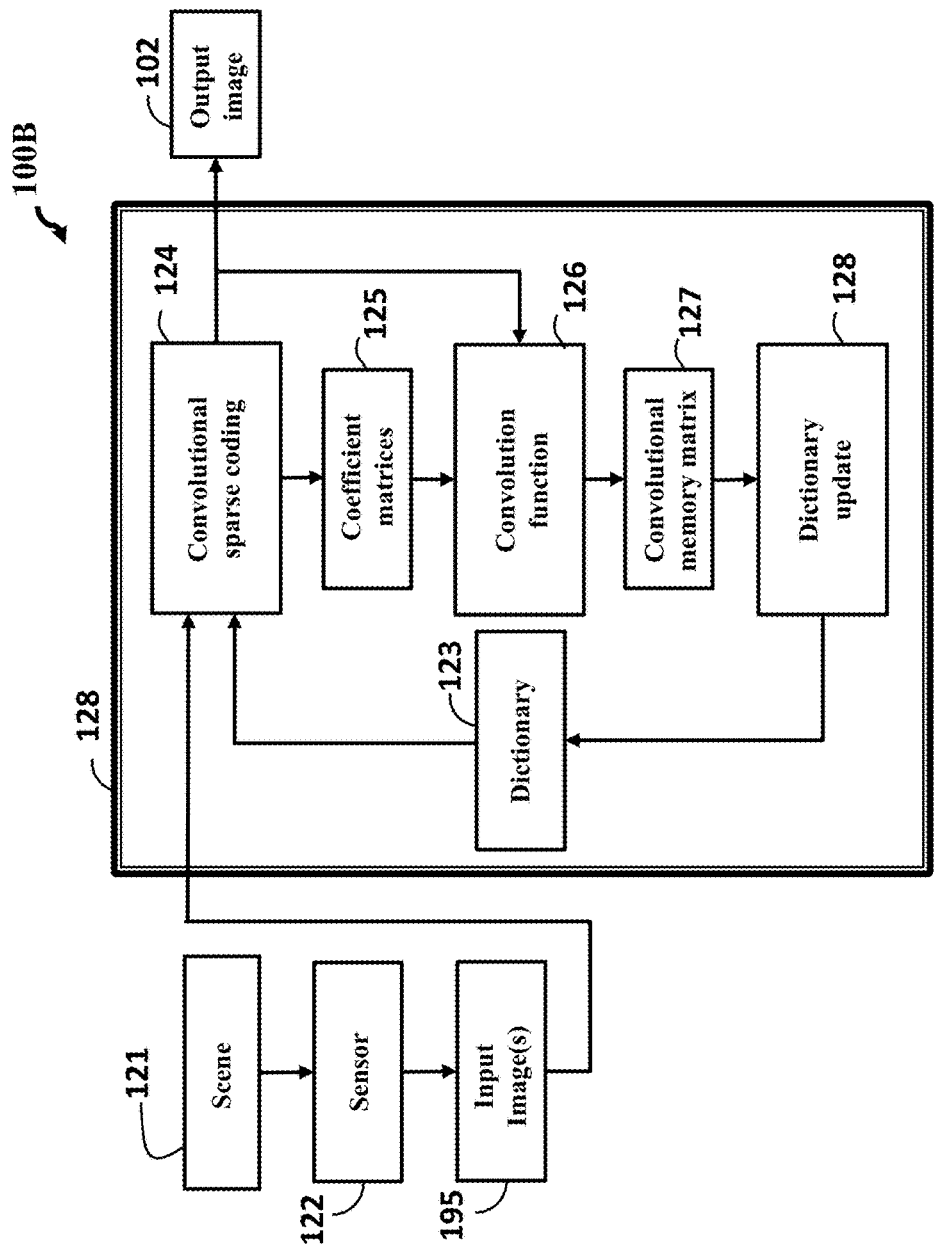
FIG. 1D is a block diagram of a computer-implemented method for image processing using OCDL according to one embodiment of the present disclosure.

FIG. 1D is a block diagram of a computer-implemented method for image processing using OCDL according to one embodiment of the present disclosure. The computer system 100B receives input images 195 from the sensor 122 of the scene 1212 and processes them via computer/controller 128, so as to produce the output image 102. Processing is done by first performing convolutional sparse coding 124 by solving a corresponding sparse-optimization problem to yield coefficient matrices 125. Those matrices are then convolved 126 to produce the convolutional memory matrix 127 that can be used for updating the dictionary 128 with low memory requirements.

FIG. 1E is a pseudo code for implementation of OCDL according to one embodiment of the present disclosure. The pseudo code describes the transformation of the streamed input images 195 into output images 102 using OCDL.

Figure 2A:
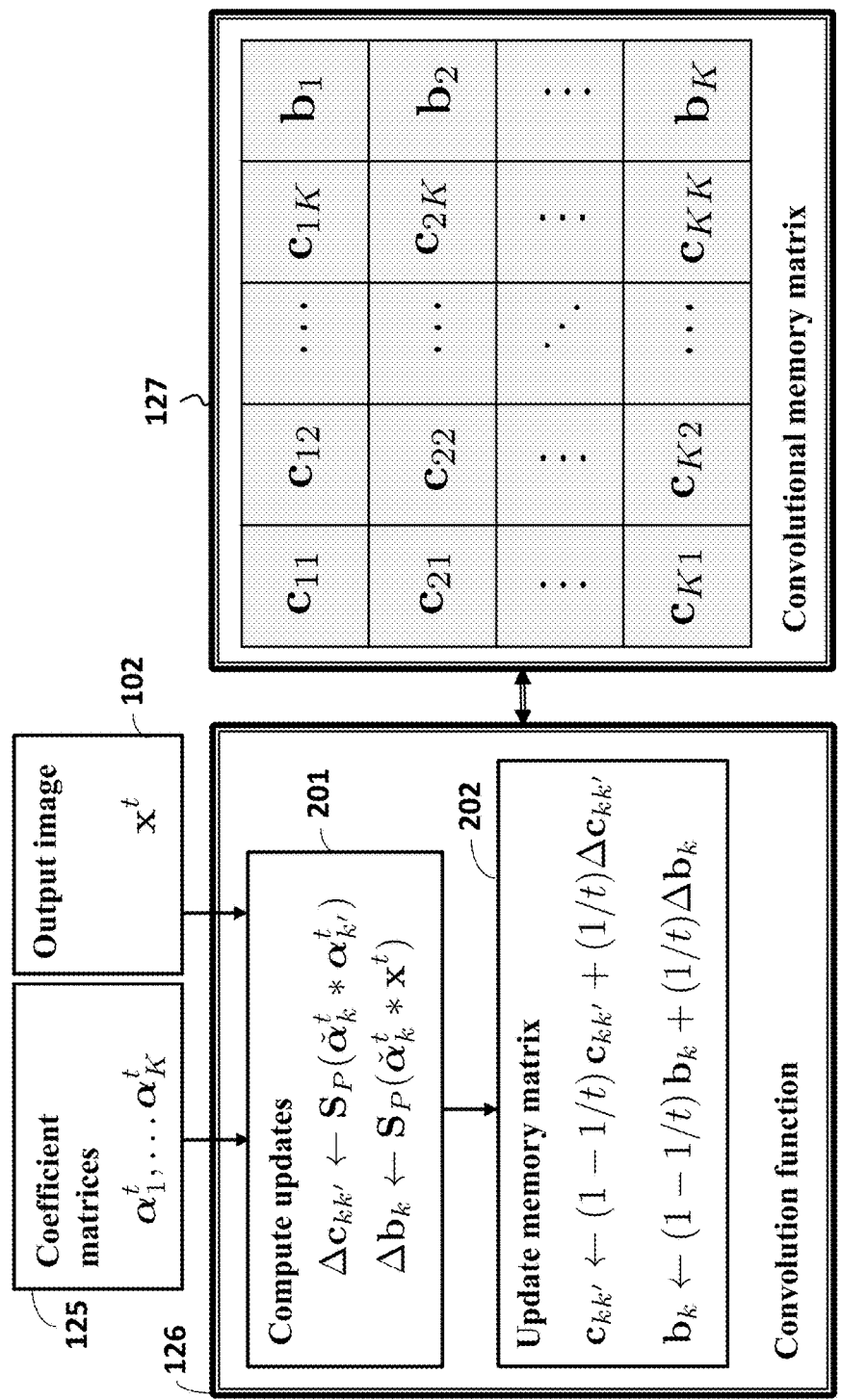
FIG. 2A is a block diagram of the convolution function according to one embodiment of the present disclosure.

FIG. 2A is a block diagram of the convolution function 126 according to one embodiment of the present disclosure. Convolution function 126 updates the convolution memory matrix 127 by first computing the updates 201 and updating memory matrix 202. Updates are computed by convolving flipped coefficient matrices 125 among each other and with the output image 102. Memory matrix is then updated by adding the updates to the memory matrix in the memory.

Figure 2B:
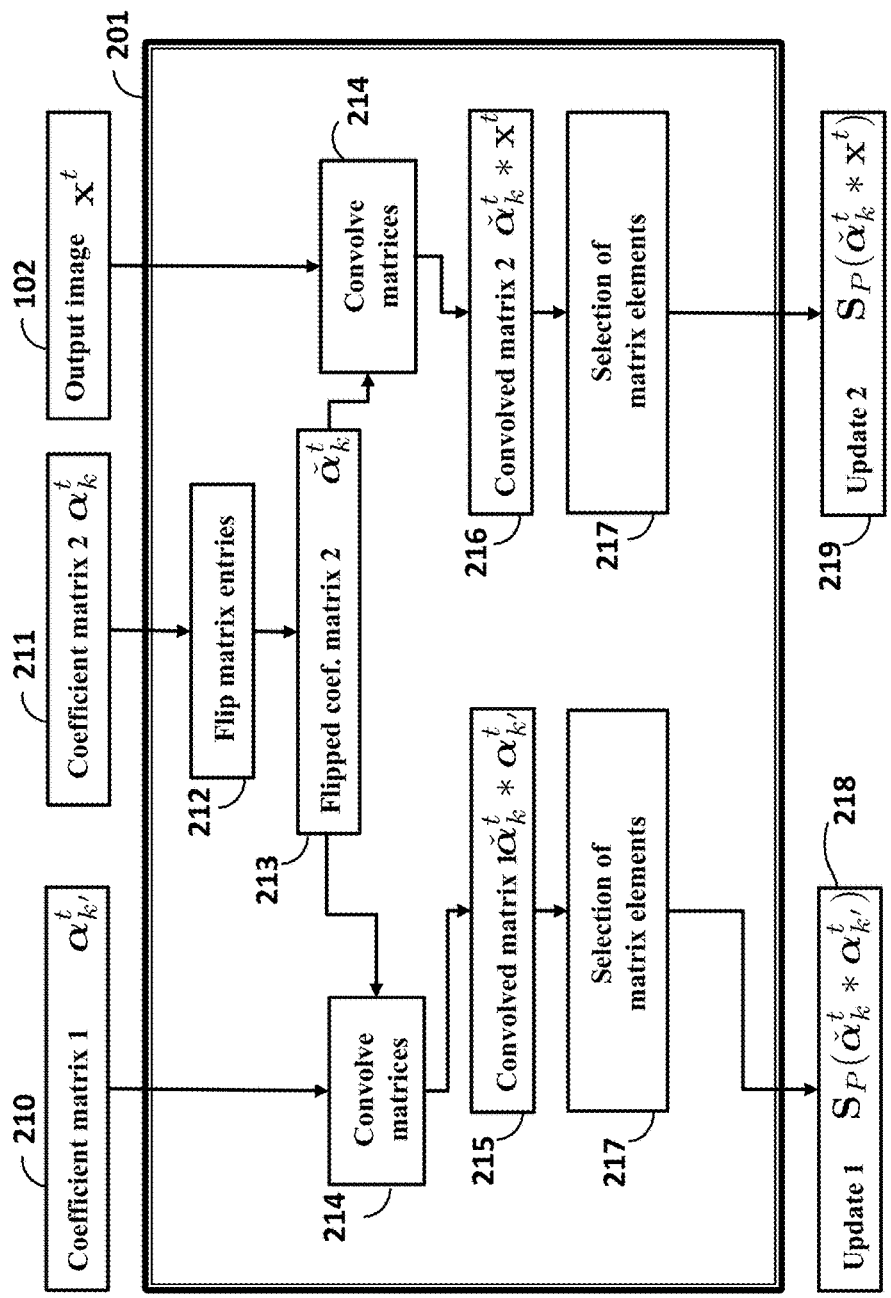
FIG. 2B is a block diagram of a method computing the updates for the convolutional memory matrix according to one embodiment of the present disclosure.

FIG. 2B is a block diagram of a method computing the updates for the convolutional memory matrix 127 of FIG. 1D, according to one embodiment of the present disclosure. Specifically, the computed updates 201 of FIG. 2A, includes the coefficient matrix 1 210, coefficient matrix 2 211, and output image 102. The coefficient matrix 2 211 is spatially flipped 212 and the flipped coefficient matrix 213 is convolved 214 with coefficient matrix 1 210 and output image 102 to produce convolved matrix 1 215 and convolved matrix 2 216. Subset of elements from the convolved matrices 215, 216 are selected 217 to match the size of convolution kernel and yield update 1 218 and update 2 219.

FIG. 3A is a pseudo code for implementation of convolutional sparse coding according to one embodiment of the present disclosure.

Figure 3B:
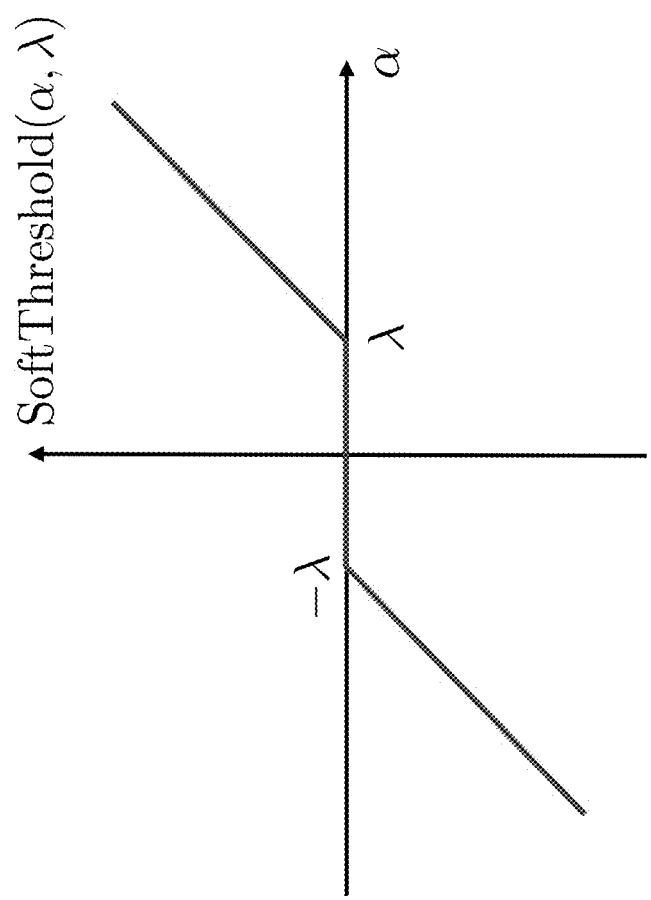
FIG. 3B is a schematic of the SoftThreshold function according to one embodiment of the present disclosure.

FIG. 3B is a schematic of the SoftThreshold function according to one embodiment of the present disclosure. SoftThreshold sets values of the input signal smaller than parameter $\lambda$ to zero and reduces larger values by $\lambda$. Application of this function leads to sparse coefficient matrices.

Online Convolutional Dictionary Learning Framework

Referring to FIG. 3A and FIG. 3B, our method and system work with linear measurements $y_l = \Phi_l x_l + e_l$, where for each modality $l \in [1, \ldots, L]$, $y_l \in \mathbb{R}^{M_l}$ denotes the corresponding measurement vector, $x_l \in \mathbb{R}^N$ denotes the unknown image, $\Phi_l \in \mathbb{R}^{M_l \times N}$ denotes the measurement matrix, and $e_l \in \mathbb{R}^{M_l}$ denotes the noise in the measurements. The images $\{x_l\}_{l \in [1, \ldots, L]}$ correspond to the same physical object viewed from different modalities. For example, each $x_l$ may represent a different color channel, spectral band, or a type of sensor. For simplicity, we assume that the desired dimension of the images is the same across all modalities and that acquisition devices are perfectly registered.

The underlying assumption in our approach is that a jointly sparse convolutional model can accurately approximate the images $\{x_l\}$ as $$x_l = D_l \alpha_l = \sum_{k=1}^{K} d_{lk} * \alpha_{lk},$$

where $\{d_{lk}\}$ is the set of LK convolutional filters in $\mathbb{R}^P$, the operator * denotes convolution, and $\{a_{lk}\}$ is the set of coefficient matrices in $\mathbb{R}^N$. Note that $D_l$ and $\alpha_l$ denote the concatenation of all K dictionaries and coefficient maps, respectively.

Convolutional Sparse Coding

Given the complete dictionary $D=(D_1, \ldots, D_L)$, we can perform convolutional sparse coding by minimizing the following cost function $$C(x, \alpha, D \mid y, \Phi) = \frac{1}{2} \| y - \Phi x \|_2^2 + \frac{\rho}{2} \| x - D\alpha \|_2^2 + \lambda \| \alpha \|_{2,1} + \tau R(x).$$

with $y=vc(y_1, \ldots, y_L)$, $x=vc(x_1, \ldots, x_L)$, and $\alpha=vc(\alpha_1, \ldots, \alpha_L)$ denoting the vertical concatenation (vc) of corresponding signals and $\Phi=\text{diag}(\Phi_1, \ldots, \Phi_L)$ denoting the block diagonal sensing matrix. The first quadratic term in the cost function measures the data-fidelity, while the second controls the approximation quality of the dictionaries. The first regularization term $$\| \alpha \|_{2,1} = \sum_{k=1}^{K} \sum_{n=1}^{N} \| \alpha_{\cdot kn} \|_2$$

imposes group- or joint-sparsity of coefficients across L modalities. Here, $\alpha_{\cdot kn} \in \mathbb{R}^L$ denotes the vector formed by the aligned entries of the coefficient matrices associated with kernel k for every modality l. Specifically, this regularizer promotes the co-occurrence of image features, encoded by the convolutional dictionary D, in all the modalities. The second regularizer in the cost C corresponds to the total variation (TV) penalty $$R(x) = \sum_{l=1}^{L} \sum_{n=1}^{N} \| [Lx_l]_n \|_2$$

where L denotes the discrete gradient operator. Unsupervised learning of dictionaries from y is complicated when the imaging problem is ill-posed. The goal of including the TV regularizer is to assist this learning. In practice, we observed significant improvement in quality when TV was included, both during learning and reconstruction. Finally, the positive constants $\rho$, $\lambda$, and $\tau$ are parameters controlling the tradeoff between the data fidelity and regularization.

As noted above FIG. 3A is a pseudo code for implementation of convolutional sparse coding, wherein, the joint optimization of the cost function for sparse coding is a convex problem. In order to solve it, we use a descent type method summarized in FIG. 3A. In particular, we split the cost $C(x,\alpha,D|y,\Phi)$ into a smooth quadratic term $$\frac{1}{2} \| y - \Phi x \|_2^2 + \frac{\rho}{2} \| x - D\alpha \|_2^2$$

and a non-smooth term that is separable in image x and coefficient matrices $\alpha$ $$\lambda \| \alpha \|_{2,1} + \tau R(x).$$

The proximal operator associated with $\lambda \| \alpha \|_{2,1}$ is equal to $$\left[ prox_{\lambda \| \cdot \|_{2,1}}(\alpha) \right]_{\cdot kn} = (\| \alpha_{\cdot kn} \|_2 - \lambda)_+ \frac{\alpha_{\cdot kn}}{\| \alpha_{\cdot kn} \|}$$

where the operator $(\cdot)_+$ extracts the positive part of its argument.

FIG. 3B is a schematic of the SoftThreshold function according to one embodiment of the present disclosure. For example, when the number of modalities is one, i.e. L=1, the proximal operator above reduces to simple soft-thresholding operator illustrated in FIG. 3B. Soft-thresholding simply sets values of the input signal smaller than parameter $\lambda$ to zero and reduces larger values by $\lambda$, which leads to sparse coefficients. While the proximal of TV does not have a closed-form solution, it can be efficiently implemented.

Dictionary Update

We consider the streamed input data where at every step $t \in \mathbb{N}$ we get a pair $(y^t, \Phi^t)$. The learning procedure attempts to minimize the cost $C(x,\alpha,D|y,\Phi)$ for all t, jointly for x, $\alpha$, and D. Specifically, let $$J^t(D) = \min_{x,\alpha} \{ C(z, \alpha, D \mid y^t, \Phi^t) \},$$

then this amounts to solving $$\min_{D \in \mathcal{D}} \{ \mathbb{E}[J^t(D)] \},$$

with respect to D, where the expectation is taken over t. Note that, to compensate for scaling ambiguities, we restrict the optimization of D to a closed convex set $\mathcal{D}$. Specifically, $\mathcal{D}$ is the set of convolutional dictionaries that have kernels in the $l_2$ ball, i.e., $\| d_{lk} \|_2 \leq 1$.

In order to solve the optimization problem with respect to D, we first perform convolutional sparse coding described in the section above to determine the image $x^t$ and coefficient matrices $\alpha^t$. Then, we would like to minimize a surrogate of $\mathbb{E}[J^t(D)]$ given by $$\frac{1}{t} \sum_{i=1}^{t} C(x^i, \alpha^i, D \mid y^i, \Phi^i).$$

FIG. 4 is a pseudo code for implementation of dictionary update according to one embodiment of the present disclosure. For example, this second step is performed by using a block gradient descent on the kernels $(d_{lk})$ as described next and summarized in FIG. 4.

Keeping $x^i$ and $\alpha^i$ fixed, the only term in C that depends on D is the quadratic coupling penalty $$\frac{\rho}{2}\|x^i - D\alpha^i\|_2^2.$$

Therefore, we can equivalently minimize $$\frac{1}{2t}\sum_{i=1}^{t} \|x_l^i - D_l\alpha_l^i\|_2^2$$

for each modality l. Since everything is separable in l, in the remainder we drop the subscript for notational clarity. Note that, since the convolution operation is commutative and the $\alpha^i$ are fixed, we can rewrite $$D\alpha^i = \sum_{k=1}^{K} d_k * \alpha_k^i = \sum_{k=1}^{K} \alpha_k^i * d_k = A^i d,$$

where $A^i = (A_1^i, \ldots, A_K^i) \in \mathbb{R}^{N \times KP}$ is the sum-of-convolutions linear operator and $d = \text{vc}(d_1, \ldots, d_K)$. In order to minimize $$G^t(d) = \frac{1}{2t}\sum_{i=1}^{t} \|x^i - A^i d\|_2^2$$

subject to $\|d_k\|_2 \le 1$, we apply the projected block coordinate descent summarized in FIG. 4.

Note that the gradient with respect to d is given by $$\nabla G^t(d) = \frac{1}{t}\sum_{i=1}^{t} [A^i]^T (A^i d - x^i),$$

where $[A^i]^T$ denotes the transpose of the operator $A^i$ which can be easily implemented by convolving with the flipped versions of the coefficient matrices. Importantly, it is possible to take advantage of all the previous iterates to compute this gradient by defining a convolutional memory matrix consisting of the following two components $$C^t = \frac{1}{t}\sum_{i=1}^{t} [A^i]^T A^i$$

$$b^t = \frac{1}{t}\sum_{i=1}^{t} [A^i]^T x^i$$

which can be computed recursively from the previous iterates as $$C^t \leftarrow \left(1 - \frac{1}{t}\right) C^{t-1} + \frac{1}{t}[A^t]^T A^t$$

$$b^t \leftarrow \left(1 - \frac{1}{t}\right) b^{t-1} + \frac{1}{t}[A^t]^T x^t$$

as summarized in FIG. 2A and FIG. 2B.

Figure 5A:
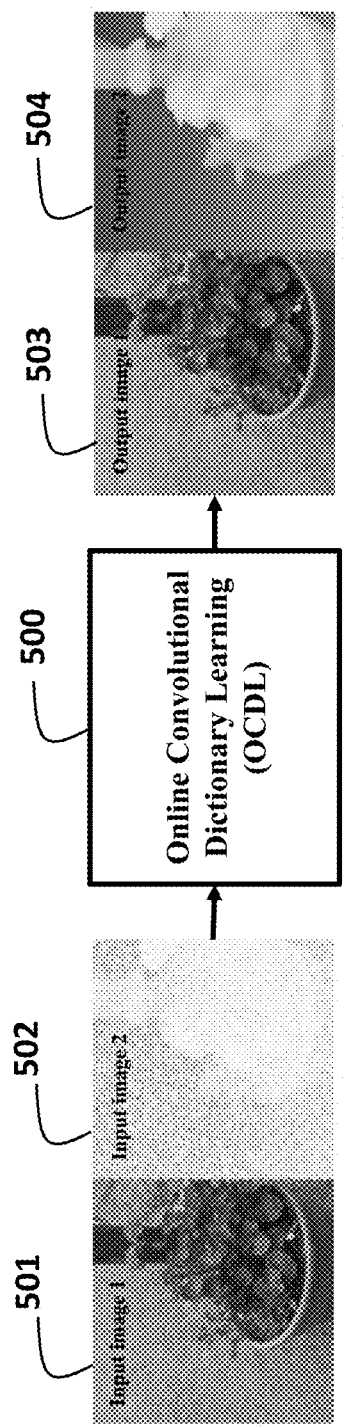
FIG. 5A is a schematic of processing two images of different modalities using OCDL in accordance with some embodiments of the present disclosure.

FIG. 5A is a schematic of processing two images of different modalities using OCDL 500 in accordance with some embodiments of the present disclosure. First input image 501 and second input image 502 are jointly processed by OCDL to produce output image 503 and output image 504. Joint convolutional dictionary learning allows to learn the co-occurring features in images 501 and 502 and use the information to improve the quality of the images.

Figure 5B:
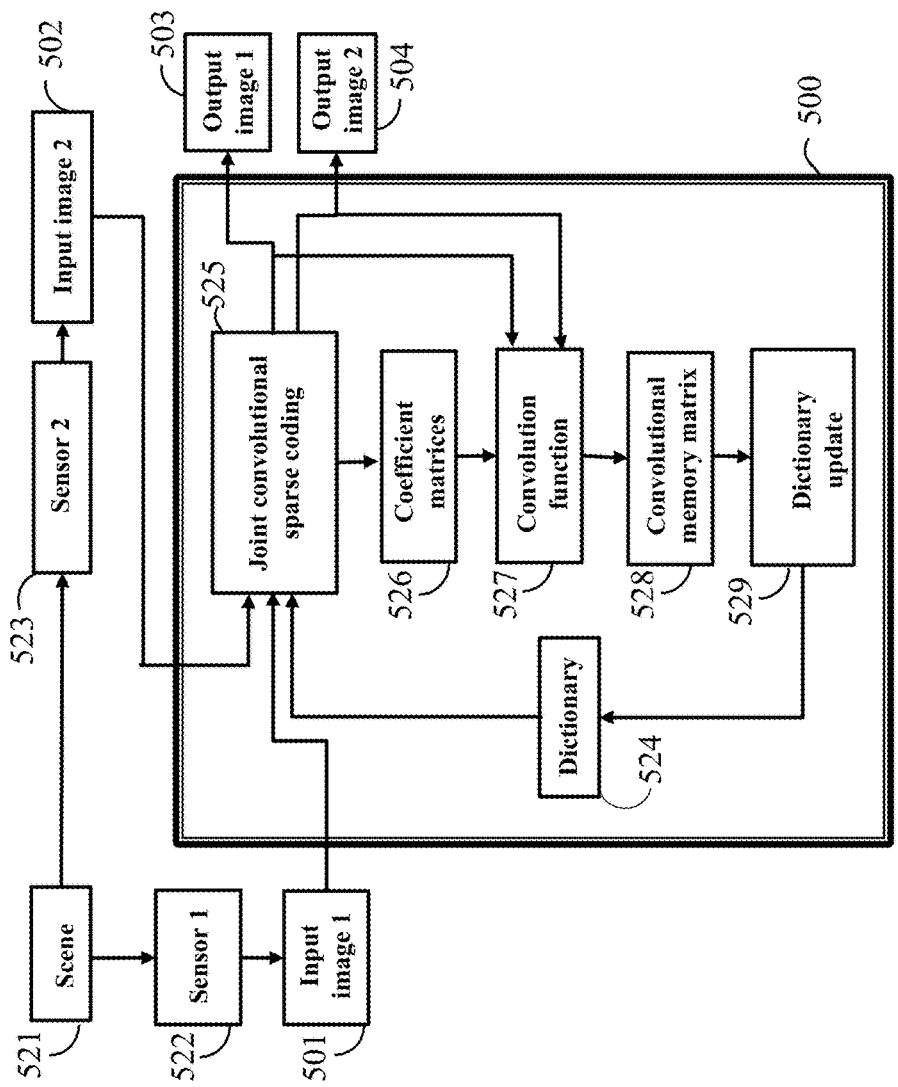
FIG. 5B is a block diagram of a computer-implemented method for processing two images of different modalities using OCDL according to one embodiment of the present disclosure.

FIG. 5B is a block diagram of a computer-implemented method for processing two images of different modalities using OCDL 500 according to one embodiment of the present disclosure. Input image 1 501 is from sensor 522 of scene 521. Input image 2 502 is from sensor 523 of scene 521. Wherein the input image 1 501 and input image 502 are fed into the joint convolutional sparse coding block 525.

The joint convolutional sparse coding 525 of input image 501 and input image 502 allows to obtain sparse coefficient matrices 526 that have shared support. Coefficient matrices 526 are then used to update the convolutional memory matrix 528 with the convolution function 527, as illustrated in FIG. 2A. Dictionary update 529 then learns the dictionary atoms corresponding to the coefficient matrices 526 sharing the same support, which allows to encode related features in input image 501 and 502. Together, learned dictionary atoms form the convolutional dictionary 524 that is passed to the next application of joint convolutional sparse coding 525.

Features

An aspect of the imaging system can include the first sensor acquiring a second image of the first modality. Wherein the processor transforms the second image as a convolution of the updated first dictionary matrix and a second coefficient matrix of convolutional representation in the first modality. Such that the processor further updates the elements of the first convolutional memory matrix with the convolutional function of correspondingly located non-zero elements of the second coefficient matrix of convolutional representation in the first modality. Wherein the processor further updates the updated first dictionary matrix using the updated first convolutional memory matrix.

Another aspect of the imaging system can include the processor transforms the first image using a convolutional sparse coding. Further, the imaging system can include the convolutional function having a selection from a sum of convolutions, wherein the convolutional function is based on $S(\check{x}_m * x_{m'})$.

Another aspect of the imaging system can further include a second sensor to acquire a sequence of images of a second modality. Wherein the memory stores a second convolutional memory matrix, such that each element of the second convolutional memory matrix is the convolution function of correspondingly located elements of coefficient matrices of convolutional representation in the second modality. Wherein the memory stores a second dictionary matrix including atoms of the images of the second modality. The processor transforms corresponding images in the first and the second modalities using a joint convolutional sparse coding to produce the first coefficient matrix representing the first image in the first modality and a second coefficient matrix representing a second image of the scene in the second modality. Wherein the processor updates the first convolutional memory matrix with the convolution function using corresponding elements of the first coefficient matrix and updates the second convolutional memory matrix with the convolution function using corresponding elements of the second coefficient matrix. Wherein the processor updates the first dictionary matrix based on the first convolutional memory matrix and updates the second dictionary matrix based on the second convolutional memory matrix. Further, it is possible the processor, in response to receiving the first image and the second image, is configured for determining a first output image in the first modality using a convolution of the first coefficient matrix and the first dictionary matrix. Determining a second output image in the second modality using a convolution of the second coefficient matrix and the second dictionary matrix.

The processor can transform the first image using a prior information on the structure of the first image. Wherein the prior information on the structure of the first image can include a total variation of values in the first image. Further, the resolution of the first image can be different from the resolution of the second image.

Another aspect of the imaging system is that the first sensor can be an intensity camera, the first image is an intensity image, the second sensor is a depth camera, and the second image is a depth image.

Another aspect of the imaging method can include the memory storing a second convolutional memory matrix, wherein each element of the first convolutional memory matrix is a convolutional function of correspondingly located elements of coefficient matrices of convolutional representation of the images of a second modality, wherein the memory stores a second dictionary matrix including atoms of the images of the second modality, and wherein the method, in response to receiving measurements of a first sensor acquiring images of the first modality and measurements of a second sensor acquiring images of the second modality, The method includes transforming corresponding images of a scene in the first and the second modalities using a joint convolutional sparse coding with the first dictionary matrix learned for the images in the first modality and the second dictionary matrix learned for the images in the second modality to produce the first coefficient matrix representing a first image of the scene in the first modality and a second coefficient matrix representing a second image of the scene of the second modality. Determining a first output image in the first modality using a convolution of the first coefficient matrix and the first dictionary matrix. Determining a second output image in the second modality using a convolution of the second coefficient matrix and the second dictionary matrix. Updating the first convolutional memory matrix with a convolutional function of correspondingly located non-zero elements of the first coefficient matrix. Updating the second convolutional memory matrix with the convolutional function of correspondingly located non-zero elements of the second coefficient matrix. Updating the first dictionary matrix using a convolution of the first coefficient matrix and the first convolutional memory matrix. Updating the second dictionary matrix using a convolution of the second coefficient matrix and the second convolutional memory matrix.

Figure 6:
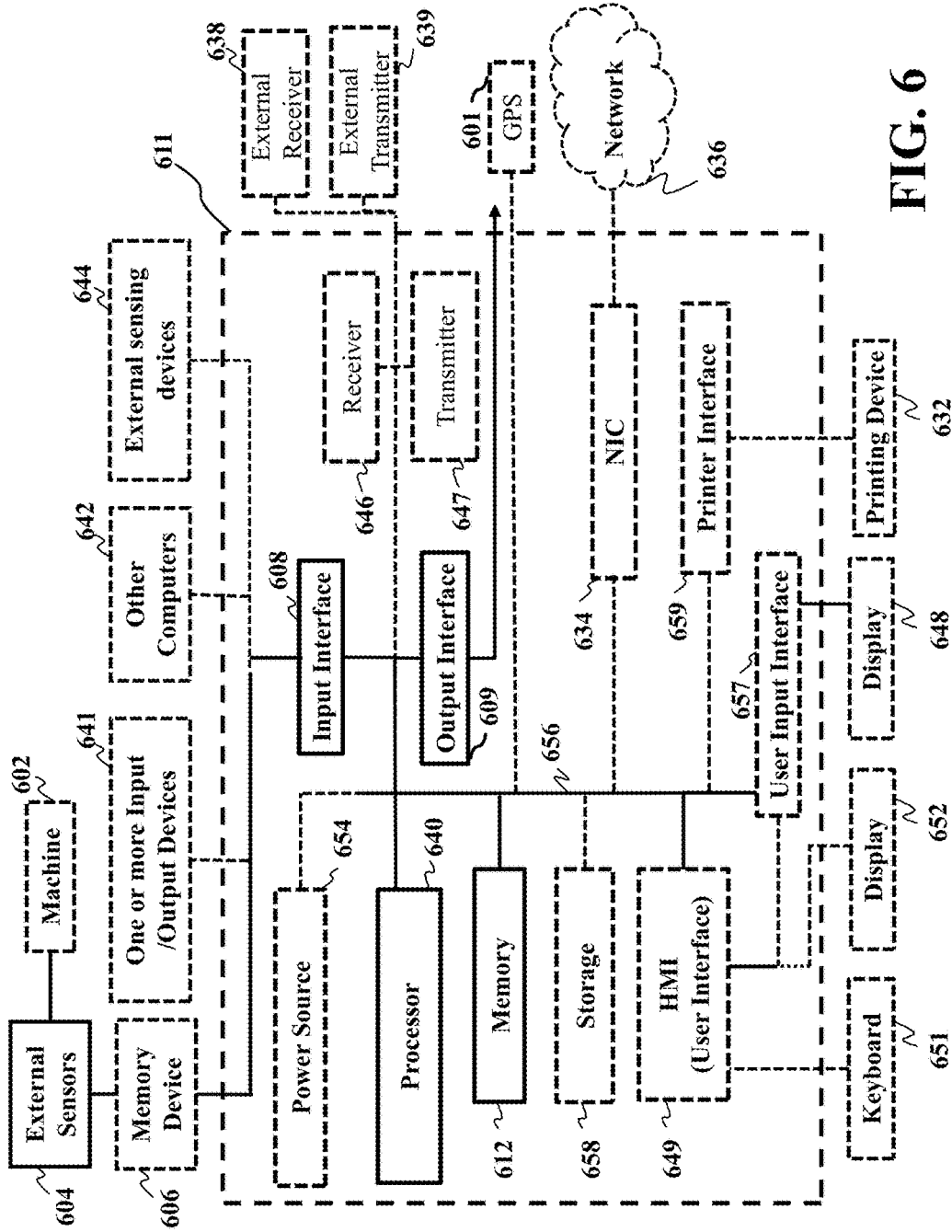
FIG. 6 is a block diagram of illustrating the method of FIG. 1A, that can be implemented using an alternate computer or controller, according to embodiments of the present disclosure.

FIG. 6 is a block diagram of illustrating the method of FIG. 1A, that can be implemented using an alternate computer or processor, according to embodiments of the present disclosure. The computer 611 includes a processor 640, computer readable memory 612, storage 658 and user interface 649 with display 652 and keyboard 651, which are connected through bus 656. For example, the user interface 649 in communication with the processor 640 and the computer readable memory 612, acquires and stores the measuring data in the computer readable memory 612 upon receiving an input from a surface, keyboard surface, of the user interface 657 by a user.

Contemplated is that the memory 612 can store instructions that are executable by the processor, historical data, and any data to that can be utilized by the methods and systems of the present disclosure. The processor 640 can be a single core processor, a multi-core processor, a computing cluster, or any number of other configurations. The processor 640 can be connected through a bus 656 to one or more input and output devices. The memory 612 can include random access memory (RAM), read only memory (ROM), flash memory, or any other suitable memory systems.

Still referring to FIG. 6, a storage device 658 can be adapted to store supplementary data and/or software modules used by the processor. For example, the storage device 658 can store historical device data and other related device data such as manuals for the devices, wherein the devices are sensing device capable of obtaining measured data as mentioned above regarding the present disclosure. Additionally, or alternatively, the storage device 658 can store historical data similar to the measuring data. The storage device 658 can include a hard drive, an optical drive, a thumb-drive, an array of drives, or any combinations thereof.

The system can be linked through the bus 656 optionally to a display interface (not shown) adapted to connect the system to a display device (not shown), wherein the display device can include a computer monitor, camera, television, projector, or mobile device, among others.

The computer 611 can include a power source 654, depending upon the application the power source 654 may be optionally located outside of the computer 611. Linked through bus 656 can be a user input interface 657 adapted to connect to a display device 648, wherein the display device 648 can include a computer monitor, camera, television, projector, or mobile device, among others. A printer interface 659 can also be connected through bus 656 and adapted to connect to a printing device 632, wherein the printing device 632 can include a liquid inkjet printer, solid ink printer, large-scale commercial printer, thermal printer, UV printer, or dye-sublimation printer, among others. A network interface controller (NIC) 634 is adapted to connect through the bus 656 to a network 636, wherein measuring data or other data, among other things, can be rendered on a third party display device, third party imaging device, and/or third party printing device outside of the computer 611.

Still referring to FIG. 6, the measuring data or other data, among other things, can be transmitted over a communication channel of the network 636, and/or stored within the storage system 658 for storage and/or further processing. Further, the measuring data or other data may be received wirelessly or hard wired from a receiver 646 (or external receiver 638) or transmitted via a transmitter 647 (or external transmitter 639) wirelessly or hard wired, the receiver 646 and transmitter 647 are both connected through the bus 656. The computer 611 may be connected via an input interface 608 to external sensing devices 644 and external input/output devices 641. The computer 611 may be connected to other external computers 642. An output interface 609 may be used to output the processed data from the processor 640.

The above-described embodiments of the present disclosure can be implemented in any of numerous ways. For example, the embodiments may be implemented using hardware, software or a combination thereof. Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. An imaging system, comprising:
   a first sensor to acquire a sequence of images of a first modality;
   a memory to store a first convolutional memory matrix, wherein each element of the first convolutional memory matrix is a convolutional function of correspondingly located elements of coefficient matrices of convolutional representation of the images of the first modality and to store a first dictionary matrix including atoms of the images of the first modality; and
   a processor to transform a first image of a scene acquired by the first sensor as a convolution of the first dictionary matrix and a first coefficient matrix, to update the elements of the first convolutional memory matrix with the convolutional function of correspondingly located non-zero elements of the first coefficient matrix, and to update the dictionary matrix using the updated first convolutional memory matrix.

2. The imaging system of claim 1, wherein the first sensor acquires a second image of the first modality, and wherein the processor transforms the second image as a convolution of the updated first dictionary matrix and a second coefficient matrix of convolutional representation in the first modality, wherein the processor further updates the elements of the first convolutional memory matrix with the convolutional function of correspondingly located non-zero elements of the second coefficient matrix of convolutional representation in the first modality, and wherein the processor further updates the updated first dictionary matrix using the updated first convolutional memory matrix.

3. The imaging system of claim 1, wherein the processor transforms the first image using a convolutional sparse coding.

4. The imaging system of claim 1, wherein the convolutional function includes a selection from a sum of convolutions.

5. The imaging system of claim 4, wherein the convolutional function is based on $S(\hat{x}_m * x_{m'})$.

6. The imaging system of claim 1, further comprising:
   a second sensor to acquire a sequence of images of a second modality;
   wherein the memory stores a second convolutional memory matrix, wherein each element of the second convolutional memory matrix is the convolution function of correspondingly located elements of coefficient matrices of convolutional representation in the second modality;
   wherein the memory stores a second dictionary matrix including atoms of the images of the second modality;
   wherein the processor transforms corresponding images in the first and the second modalities using a joint convolutional sparse coding to produce the first coefficient matrix representing the first image in the first modality and a second coefficient matrix representing a second image of the scene in the second modality,
   wherein the processor updates the first convolutional memory matrix with the convolution function using corresponding elements of the first coefficient matrix and updates the second convolutional memory matrix with the convolution function using corresponding elements of the second coefficient matrix; and
   wherein the processor updates the first dictionary matrix based on the first convolutional memory matrix and updates the second dictionary matrix based on the second convolutional memory matrix.

7. The imaging system of claim 6, wherein the processor, in response to receiving the first image and the second image, is configured for
   determining a first output image in the first modality using a convolution of the first coefficient matrix and the first dictionary matrix; and
   determining a second output image in the second modality using a convolution of the second coefficient matrix and the second dictionary matrix.

8. The imaging system of claim 6, wherein the resolution of the first image is different from the resolution of the second image.

9. The imaging system of claim 8, wherein the first sensor is an intensity camera, the first image is an intensity image, the second sensor is a depth camera, and the second image is a depth image.

10. The imaging system of claim 1, wherein the processor transforms the first image using a prior information on the structure of the first image.

11. The imaging system of claim 10, wherein the prior information on the structure of the first image includes a total variation of values in the first image.

12. A method for image processing, wherein the method uses a processor coupled to a memory storing a first convolutional memory matrix, wherein each element of the first convolutional memory matrix is a convolutional function of correspondingly located elements of coefficient matrices of convolutional representation of images of a first modality, the memory storing a first dictionary matrix including atoms of the images of the first modality, wherein the processor is coupled with stored instructions implementing the method, wherein the instructions, when executed by the processor carry out steps of the method, comprising:
   transforming a first image of a scene in the first modality as a convolution of the first dictionary matrix and a first coefficient matrix;
   updating the elements of the first convolutional memory matrix with the convolutional function of correspondingly located non-zero elements of the first coefficient matrix; and
   updating the first dictionary matrix using the updated first convolutional memory matrix, wherein the updated dictionary matrix assists in improving imaging processing such as with denoising as well as with data fusion.

13. The method of claim 12, wherein the memory stores a second convolutional memory matrix, wherein each element of the first convolutional memory matrix is a convolutional function of correspondingly located elements of coefficient matrices of convolutional representation of the images of a second modality, wherein the memory stores a second dictionary matrix including atoms of the images of the second modality, and wherein the method, in response to receiving measurements of a first sensor acquiring images of the first modality and measurements of a second sensor acquiring images of the second modality, comprises:
   transforming corresponding images of a scene in the first and the second modalities using a joint convolutional sparse coding with the first dictionary matrix learned for the images in the first modality and the second dictionary matrix learned for the images in the second modality to produce the first coefficient matrix representing a first image of the scene in the first modality and a second coefficient matrix representing a second image of the scene of the second modality;

determining a first output image in the first modality using a convolution of the first coefficient matrix and the first dictionary matrix;

determining a second output image in the second modality using a convolution of the second coefficient matrix and the second dictionary matrix;

updating the first convolutional memory matrix with a convolutional function of correspondingly located non-zero elements of the first coefficient matrix;

updating the second convolutional memory matrix with the convolutional function of correspondingly located non-zero elements of the second coefficient matrix;

updating the first dictionary matrix using a convolution of the first coefficient matrix and the first convolutional memory matrix; and updating the second dictionary matrix using a convolution of the second coefficient matrix and the second convolutional memory matrix.

14. The method of claim 12, wherein the method transforms the first image using a prior information on the structure of the first image, wherein the prior information on the structure of the first image includes a total variation of values in the first image.

15. A non-transitory computer readable storage medium embodied thereon a program executable by a processor for performing a method, the method comprising:

transforming corresponding images of a scene in a first modality and a second modality using a joint convolutional sparse coding with a first dictionary matrix learned for the images in the first modality and a second dictionary matrix learned for the images in the second modality to produce a first coefficient matrix representing a first image of the scene in the first modality and a second coefficient matrix representing a second image of the scene of the second modality;

determining a first output image in the first modality using a convolution of the first coefficient matrix and the first dictionary matrix;

determining a second output image in the second modality using a convolution of the second coefficient matrix and the second dictionary matrix;

updating a first convolutional memory matrix with a convolutional function of correspondingly located non-zero elements of the first coefficient matrix;

updating a second convolutional memory matrix with the convolutional function of correspondingly located non-zero elements of the second coefficient matrix, wherein each element of the first and second convolutional memory matrices is a convolutional function of correspondingly located elements of coefficient matrices of convolutional representation of the images of the first and second modality, respectively;

updating the first dictionary matrix using a convolution of the first coefficient matrix and the first convolutional memory matrix; and updating the second dictionary matrix using a convolution of the second coefficient matrix and the second convolutional memory matrix.

16. The method of claim 15, wherein the processor transforms the first image using a convolutional sparse coding.

17. The method of claim 15, wherein the convolutional function includes a selection from a sum of convolutions.

18. The method of claim 17, wherein the convolutional function is based on $S(\check{x}_m * x_{m'})$.

19. The method of claim 15, further comprising:

a first sensor is an intensity camera to acquire a sequence of images of the first modality;

a second sensor is a depth camera to acquire a sequence of images of the second modality;

wherein the memory stores a second convolutional memory matrix, wherein each element of the second convolutional memory matrix is the convolution function of correspondingly located elements of coefficient matrices of convolutional representation in the second modality;

wherein the memory stores a second dictionary matrix including atoms of the images of the second modality;

wherein the processor transforms corresponding images of the scene in the first and the second modalities using a joint convolutional sparse coding with the first dictionary matrix learned for the images in the first modality and the second dictionary matrix learned for the images in the second modality to produce the first coefficient matrix representing the first image of the scene in the first modality and a second coefficient matrix representing a second image of the scene in the second modality, wherein the processor updates the first convolutional memory matrix with the convolution function using corresponding elements of the first coefficient matrix and updates the second convolutional memory matrix with the convolution function using corresponding elements of the second coefficient matrix; and wherein the processor updates the first dictionary matrix based on the first convolutional memory matrix and updates the second dictionary matrix based on the second convolutional memory matrix.

20. The method of claim 19, wherein the processor, in response to receiving the first image and the second image, is configured for determining a first output image in the first modality using a convolution of the first coefficient matrix and the first dictionary matrix; and determining a second output image in the second modality using a convolution of the second coefficient matrix and the second dictionary matrix.

* * * * *